(12) United States Patent
Liu et al.

(10) Patent No.: US 11,630,827 B2
(45) Date of Patent: Apr. 18, 2023

(54) METHOD FOR RECOMMENDING CHART, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Yiming Liu, Beijing (CN); Jun Zhang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/397,505

(22) Filed: Aug. 9, 2021

(65) Prior Publication Data
US 2021/0365448 A1 Nov. 25, 2021

(30) Foreign Application Priority Data
Sep. 25, 2020 (CN) .......................... 202011027640.3

(51) Int. Cl.
*G06F 16/2457* (2019.01)
*G06F 16/22* (2019.01)
*G06F 16/242* (2019.01)
*G06F 16/26* (2019.01)

(52) U.S. Cl.
CPC ...... *G06F 16/2457* (2019.01); *G06F 16/2237* (2019.01); *G06F 16/2428* (2019.01); *G06F 16/26* (2019.01)

(58) Field of Classification Search
CPC ............. G06F 16/2457; G06F 16/2237; G06F 16/2428; G06F 16/26
USPC ....................................................... 707/758, 2
See application file for complete search history.

(56) References Cited

U.S. PATENT DOCUMENTS

| 5,461,708 | A | 10/1995 | Kahn | |
| 8,874,586 | B1* | 10/2014 | Sommers | G06F 16/9535 707/758 |
| 9,633,457 | B2* | 4/2017 | Toyoshima | G06T 11/206 |
| 10,713,579 | B2* | 7/2020 | Ahmed | G06Q 30/0631 |
| 11,093,842 | B2* | 8/2021 | Spangler | G06F 16/338 |
| 11,269,870 | B2* | 3/2022 | Bhatia | G06N 7/01 |

(Continued)

FOREIGN PATENT DOCUMENTS

| JP | 2019046285 A | 3/2019 |
| JP | 2020003880 A | 1/2020 |

OTHER PUBLICATIONS

Search Report for EP application 21190463.6 dated Jan. 18, 2022.
JP Office Action in Application No. 2021-130066 dated Aug. 9, 2022.

*Primary Examiner* — Giovanna B Colan
(74) *Attorney, Agent, or Firm* — Maschoff Brennan

(57) ABSTRACT

The disclosure provides a method and an apparatus for recommending a chart, an electronic device, and a storage medium. The method may include: generating an input vector of at least one input field relative to each chart based on the at least one input field obtained in advance; calculating a similarity of the input vector and a predetermined feature vector corresponding to each chart; obtaining a target chart corresponding to the at least one input field based on the similarity between the input vector and the predetermined feature vector corresponding to each chart; and sending the target chart to a terminal device.

14 Claims, 5 Drawing Sheets

(56) References Cited

U.S. PATENT DOCUMENTS

| | | | |
|---|---|---|---|
| 11,522,873 B2* | 12/2022 | Chu | G06N 20/00 |
| 11,526,727 B1* | 12/2022 | Mitchell | G06N 3/042 |
| 2002/0152390 A1* | 10/2002 | Furuyama | G06Q 20/341 |
| | | | 713/185 |
| 2006/0224562 A1* | 10/2006 | Yan | G16C 20/40 |
| 2013/0176315 A1 | 7/2013 | Winkle et al. | |
| 2014/0184607 A1* | 7/2014 | Toyoshima | G06T 11/206 |
| | | | 345/440 |
| 2016/0140643 A1* | 5/2016 | Nice | G06F 16/3344 |
| | | | 705/26.7 |
| 2018/0165851 A1 | 6/2018 | Apte et al. | |
| 2019/0139280 A1 | 5/2019 | Hubel | |
| 2019/0266257 A1* | 8/2019 | Natchu | G06F 16/137 |
| 2019/0392032 A1 | 12/2019 | Yasui et al. | |
| 2020/0285672 A1 | 9/2020 | Kumar | |

* cited by examiner

METHOD FOR RECOMMENDING CHART, ELECTRONIC DEVICE, AND STORAGE MEDIUM

CROSS-REFERENCE TO RELATED APPLICATION

This application is based on and claims priority to Chinese Patent Application No. 202011027640.3 filed on Sep. 25, 2020, the content of which is hereby incorporated by reference in its entirety into this disclosure.

TECHNICAL FIELD

The disclosure relates to the field of artificial intelligence (AI), further to the field of deep learning technologies, and particularly to a method for recommending a chart, an electronic device, and a storage medium.

BACKGROUND

An original procedure of producing a chart normally may be to specify a chart type by a user such as a line chart, a pie chart, a sunburst chart; and to bind each input field to each part of the corresponding chart such as X axis, Y axis. Such a procedure requires the user to understand characteristics of various charts in advance, as well as what kinds of data are appropriate for various charts to illustrate. If the user does not understand the characteristics of various charts, it is impossible to accurately select the most suitable chart.

SUMMARY

According to a first aspect, a method for recommending a chart is provided. The method may include: generating an input vector of at least one input field relative to each chart based on the at least one input field obtained in advance; calculating a similarity of the input vector and a predetermined feature vector corresponding to each chart; obtaining a target chart corresponding to the at least one input field based on the similarity between the input vector and the predetermined feature vector corresponding to each chart; and sending the target chart to a terminal device.

According to a second aspect, an electronic device is provided. The electronic device may include: at least one processor; and a memory communicatively coupled to the at least one processor; in which, the memory is configured to store instructions executable by the at least one processor, and when the instructions are executed by the at least one processor, the at least one processor is caused to perform the method as described above.

According to a third aspect, a non-transitory computer-readable storage medium storing computer instructions is provided, in which the computer instructions are configured to enable a computer to perform the method as described above.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The accompanying drawings are used to understand the solution better, and do not constitute a limitation on the application, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

The conventional strategy for recommending a chart in the related art for recommending a chart may recommend based on a decision tree defined in advance. In detail, the decision tree may be divided into layers, and each layer decides a characteristic of the input field to filter out a batch of charts; and when the last layer of the decision tree is reached, a final recommendation result may be obtained. The decision tree-based recommendation strategy may be practicable to a scene where there are few types of charts and simple fields. However, it is difficult to provide an accurate recommendation result based on the decision tree-based recommendation strategy under a scene where there are many types of charts and complex fields. For example, there are 45 types of charts or more as recommendation candidates, and data field types are divided into 3 categories and 5 subcategories; in addition, some charts have various characteristics of their own, for example, some charts are more suitable to multi-unit measurements, and some charts are suitable for displaying percentages. It becomes very difficult to design a decision tree in this scene. Even if the decision tree in this scene is designed, its complexity may be high, and the cost of expansion and maintenance may be high. In addition, when new chart types are added in the future, or new information needs to be added to the decision-making procedure, such as statistical information of each field, it is very likely that the entire decision tree may be adjusted at this time, which is very costly; and the recommendation result based on the decision tree is generally a single chart type, and a recommendation list sorted by recommendation degrees may not be given as the result.

Figure 1:
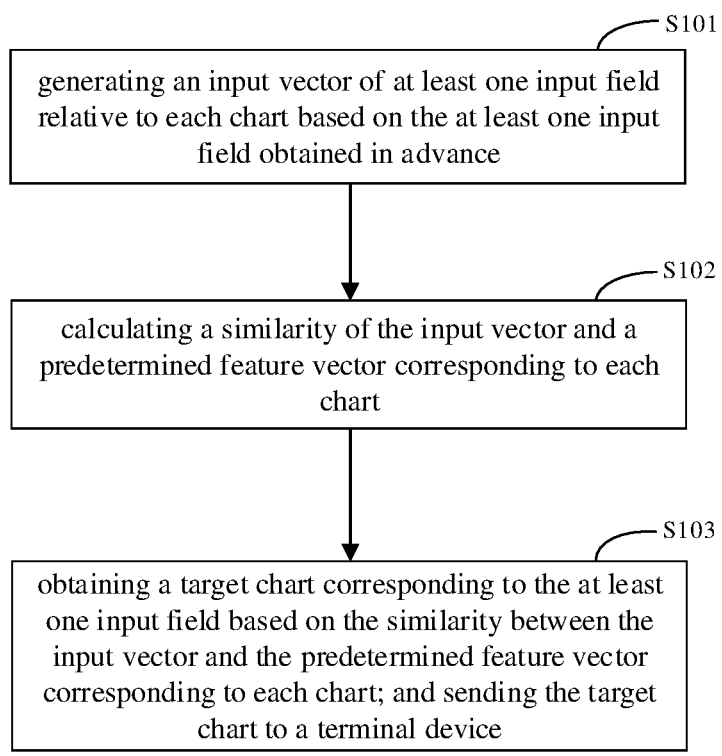
FIG. 1 is a first flowchart illustrating a method for recommending a chart according to some embodiments of the disclosure.

FIG. 1 is a first flowchart illustrating a method for recommending a chart according to some embodiments of the disclosure. The method may be performed by an apparatus for recommending a chart or an electronic device. The apparatus or the electronic device may be implemented by software and/or hardware. The apparatus or the electronic device may be integrated in any smart device having network communication functions. As illustrated in FIG. 1, the method may include the following.

At block S101, an input vector of at least one input field relative to each chart is generated based on the at least one input field obtained in advance.

In this action, the electronic device may generate the input vector of the at least one input field relative to each chart based on the at least one input field obtained in advance. In detail, the electronic device may determine a purpose of each input field based on a type of a container located by each input field; and generate the input vector of the at least one input field relative to each chart based on the purpose of each input field, a predetermined type of each input field, and a unit of each input field. In detail, the electronic device may extract a chart from all charts as a current chart; adjust the purpose of each input field, the type of each input field, or the unit of each input field based on a feature vector corresponding to the current chart, in response to the at least one input field satisfying a preset adjustment condition, to obtain a target purpose of each input field, a target type of each input field, and a target unit of each input field; generate an input vector of the at least one input field relative to the current chart based on the target purpose of each input field, the target type of each input field, and the target unit of each input field; and repeat the foregoing actions until the input vector of the at least one input field relative to each chart is calculated.

At block S102, a similarity of the input vector and a predetermined feature vector corresponding to each chart is calculated.

In this action, the electronic device may perform the similarity calculation on the input vector and the predetermined feature vector corresponding to each chart to obtain the similarity of the input vector and each feature vector. In detail, the electronic device may extract a chart from all charts as a current chart; calculate a similarity of an input vector of the at least one input field relative to the current chart and a feature vector corresponding to the current chart based on the input vector of the at least one input field relative to the current chart and the feature vector corresponding to the current chart; and repeat the foregoing action of extracting the current chart until the similarity between each input vector and each feature vector is calculated. In detail, the electronic device may extract a factor from the input vector of the at least one input field relative to the current chart as a current input factor; extract a factor from the feature vector corresponding to the current chart as a current feature factor; mark a component corresponding to the current input factor and the current feature factor as a valid component in response to the current input factor being the same as the current feature factor; mark a component corresponding to the current input factor and the current feature factor as an invalid component in response to the current input factor being not the same as the current feature factor; repeat the foregoing actions of extracting the current input factor and the current feature factor as described above until a component corresponding to each input factor and each feature factor is marked as the valid component or the invalid component; and calculate the similarity of the input vector of the at least one input field relative to the current chart and the feature vector corresponding to the current chart based on the component corresponding to each input factor and each feature factor and a preset weight value of each component.

At block S103, a target chart corresponding to the at least one input field is obtained based on the similarity between the input vector and the predetermined feature vector corresponding to each chart; and the target chart is sent to a terminal device.

In this action, the electronic device may obtain the target chart corresponding to the at least one input field based on the similarity between the input vector and the predetermined feature vector corresponding to each chart; and send the target chart to the terminal device. In detail, the electronic device may calculate a score of the at least one input field relative to each chart based on the similarity of each input vector and each feature vector; and sort the score of the at least one input field relative to each chart, and select one or more charts with the highest score as the target chart corresponding to at least one input field.

With the method for recommending the chart proposed in the disclosure, the input vector of the at least one input field relative to each chart is generated based on the at least one input field obtained in advance. The similarity of the input vector and the predetermined feature vector corresponding to each chart is calculated. The target chart corresponding to the at least one input field is obtained based on the similarity between the input vector and the predetermined feature vector corresponding to each chart; and the target chart is sent to a terminal device. That is, the disclosure may calculate the input vector of the at least one input field for each of the charts; calculate different input vectors for different charts on the same at least one input field; and calculate the similarity of each input vector and the feature vector corresponding to each chart. In the existing method for recommending the chart, the recommending may be performed based on pre-defined decision tree, which is unable to apply to a scene where there are many types of charts and complex fields. Since the disclosure employs the technical means of calculating the input vector of the at least one input field for each of the charts respectively, and calculating the similarity based on each input vector and each feature vector, the technical problems that the existing method for recommending the chart based on the pre-defined decision tree may be unable to apply to the scene where there are many types of charts and complex fields may be overcome. The technical solutions provided by the disclosure may not only effectively reduce the complexity of chart recommendation, but also improve the accuracy of chart recommendation; in addition, the technical solutions provided by the disclosure may be simple and convenient, easy to popularize, and have a wide range of applications.

Figure 2:
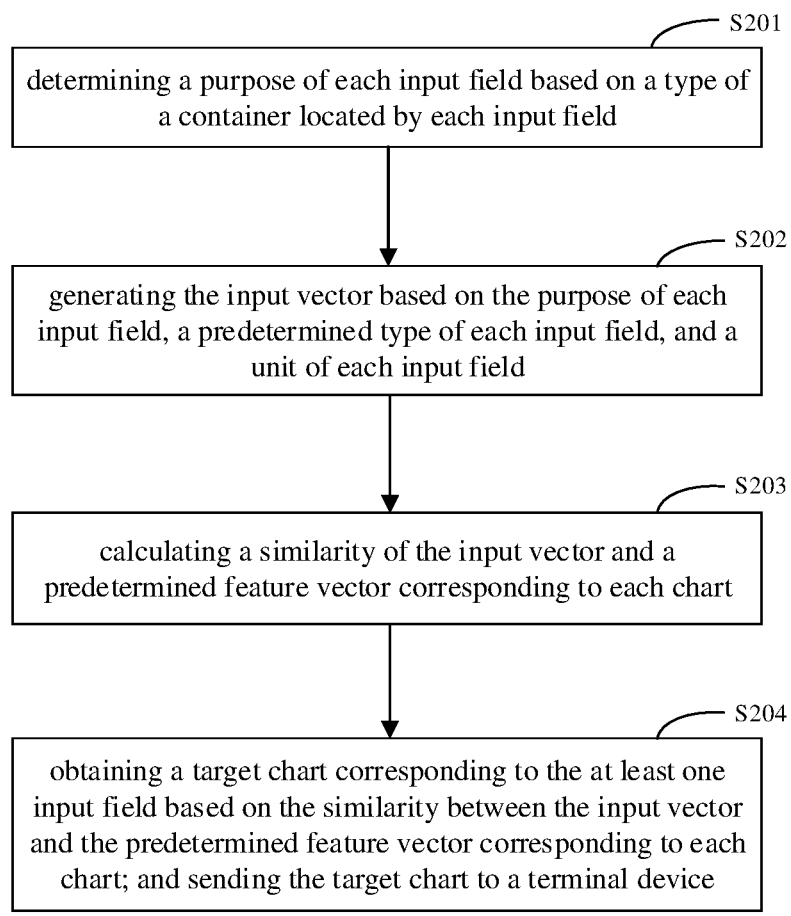
FIG. 2 is a second flowchart illustrating a method for recommending a chart according to some embodiments of the disclosure.

FIG. 2 is a second flowchart illustrating a method for recommending a chart according to some embodiments of the disclosure. Based on the above technical solution, further optimization and expansion may be performed, and may be combined with various alternative embodiments described above. As illustrated in FIG. 2, the method may include the following.

At block S201, a purpose of each input field is determined based on a type of a container located by each input field.

In this action, the electronic device may determine the purpose of each input field based on the type of the container located by each input field. In detail, the user may input each input field into different containers, and each container corresponds to a type. For example, the type of the container may include at least one of the following: column/x-axis, row/y-axis, indicator/value, color/classification, size/angle, label/name; and different types correspond to different purposes. The electronic device may determine the purposes of various input fields based on the types of the containers located by various input field.

Figure 3:
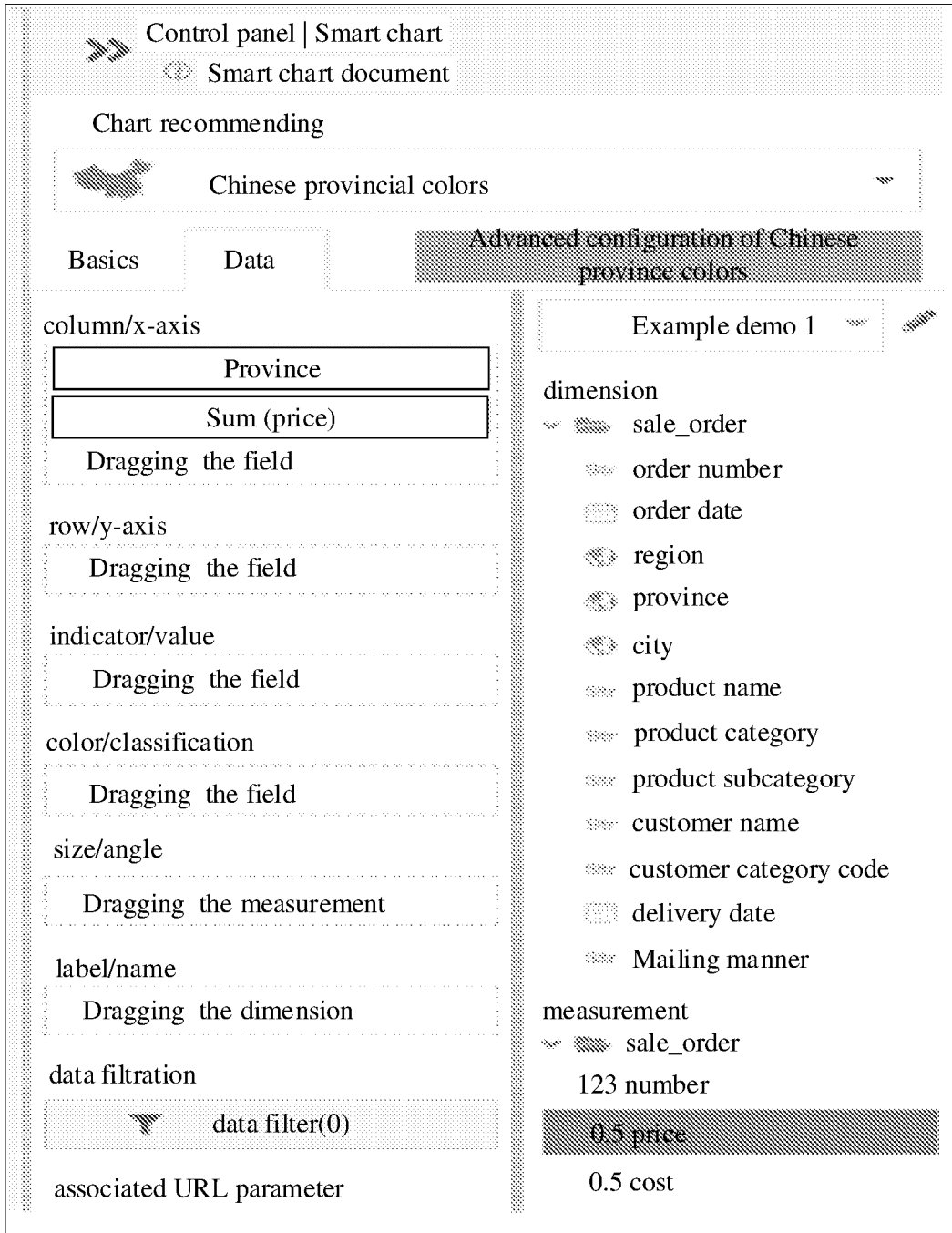
FIG. 3 is a schematic diagram illustrating an interface for recommending a chart according to some embodiments of the disclosure.

FIG. 3 is a schematic diagram illustrating an interface for recommending a chart according to some embodiments of the disclosure. As illustrated in FIG. 3, in the interface for recommending the chart, the user may drag the selected field in the data table into any container based on her/his own will. For example, the left half of the interface lists six containers, respectively: column/x-axis, row/y-axis, indicator/value, color/classification, size/angle, label/name; the right half of the interface lists each candidate field to be provided to the user for selection, respectively: product name, manufacturer, delivery date, national, region, city, subcategory, customer name, province, subdivision code, order_ID, order date, mailing manner, discount, etc.

At block S202, the input vector is generated based on the purpose of each input field, a predetermined type of each input field, and a unit of each input field.

In this action, the electronic device may generate the input vector based on the purpose of each input field, the predetermined type of each input field, and the unit of each input field. In detail, the electronic device may extract a chart from all charts as a current chart; adjust the purpose of each input field, the type of each input field, or the unit of each input field based on a feature vector corresponding to the current chart, in response to the at least one input field satisfying a preset adjustment condition, to obtain a target purpose of each input field, a target type of each input field, and a target unit of each input field; generate an input vector of the at least one input field relative to the current chart based on the target purpose of each input field, the target type of each input field, and the target unit of each input field; and repeat the foregoing actions until each input vector is calculated. In detail, the electronic device may determine a value of each factor associated with a field purpose in the input vector based on the target purpose of each input field; determine a value of each factor associated with a field main type and a value of each factor associated with a field subtype in the input vector based on the target type of each input field; in which the type of the input field includes the field main type and the field subtype; determine a value of each factor associated with a chart feature in the input vector based on the target type of each input field and the target unit of each input field; and generate the input vector based on the value of each factor associated with the field purpose, the value of each factor associated with the field main type, the value of each factor associated with the field subtype, and the value of each factor associated with the chart feature.

Furthermore, in some embodiments of the disclosure, each factor associated with the field purpose may include: a number of color fields, a number of angle fields, a number of row fields, and a number of column fields; each factor associated with the field main type may include: a number of dimension fields, a number of measurement fields, and a number of arbitrary fields; each factor associated with the field subtype may include: a number of geographic fields, a number of longitude fields, a number of latitude fields, a number of date fields, and a number of time fields; and each factor associated with the chart feature may include: whether there is at least one field whose subtype is a date in the at least one input field, and whether there are at least two fields with different units in the at least one input field. That is, the format of the input vector is as follows: [the number of color fields, the number of angle fields, the number of row fields, the number of column fields, the number of dimension fields, the number of measurement fields, the number of arbitrary fields, the number of geographic fields, the number of longitude fields, the number of latitude fields, the number of date fields, the number of time fields, whether there is at least one field whose subtype is a date in the at least one input field, whether there are at least two fields with different units in the at least one input field].

At block S203, a similarity of the input vector and a predetermined feature vector corresponding to each chart is calculated.

In this action, the electronic device may perform the similarity calculation on the input vector and the predetermined feature vector corresponding to each chart to obtain the similarity of the input vector and each feature vector. It should be noted that the feature vector corresponding to each chart may be determined based on requirements of the chart for fields. That is, the feature vector for each chart may be generated based on the requirements of the chart for the fields. For example, for a line chart: a dimension is required as a row, and at least one measurement is required as a column, which is good at displaying data containing the date class and there is multi-unit optimization; the feature vector corresponding to the line chart is: [0, 0, 0, 0, 0, 0, 1, 1, 0, 1, 1, 0, 0, 1, 1]. For example, for a pie chart: a dimension is required as a color, and a measurement is required as an angle; the feature vector corresponding to the pie chart is: [0, 0, 0, 0, 0, 1, 1, 0, 0, 0, 1, 1, 0, 0]. For example, for a sunburst chart: two dimension fields are required as colors, and a measurement is required as an angle; the feature vector corresponding to the sunburst chart is: [0, 0, 0, 0, 0, 2, 1, 0, 0, 0, 2, 1, 0, 0]. For example, for a map chart: a geographic dimension, and a measurement are required; the feature vector corresponding to the map chart is: [1, 0, 0, 0, 0, 1, 1, 0, 0, 0, 1, 0, 0].

At block S204, a target chart corresponding to the at least one input field is obtained based on the similarity between the input vector and the predetermined feature vector corresponding to each chart; and the target chart is sent to a terminal device.

With the method for recommending the chart proposed in the disclosure, the input vector of the at least one input field relative to each chart is generated based on the at least one input field obtained in advance. The similarity of the input vector and the predetermined feature vector corresponding to each chart is calculated. The target chart corresponding to the at least one input field is obtained based on the similarity between the input vector and the predetermined feature vector corresponding to each chart; and the target chart is sent to a terminal device. That is, the disclosure may calculate the input vector of the at least one input field for each of the charts; calculate different input vectors for different charts on the same at least one input field; and calculate the similarity of each input vector and the feature vector corresponding to each chart. In the existing method for recommending the chart, the recommending may be performed based on pre-defined decision tree, which is unable to apply to a scene where there are many types of charts and complex fields. Since the disclosure employs the technical means of calculating the input vector of the at least one input field for each of the charts respectively, and calculating the similarity based on each input vector and each feature vector, the technical problems that the existing method for recommending the chart based on the pre-defined decision tree may be unable to apply to the scene where there are many types of charts and complex fields may be overcome. The technical solutions provided by the disclosure may not only effectively reduce the complexity of chart recommendation, but also improve the accuracy of chart recommendation; in addition, the technical solutions provided by the disclosure may be simple and convenient, easy to popularize, and have a wide range of applications.

Figure 4:
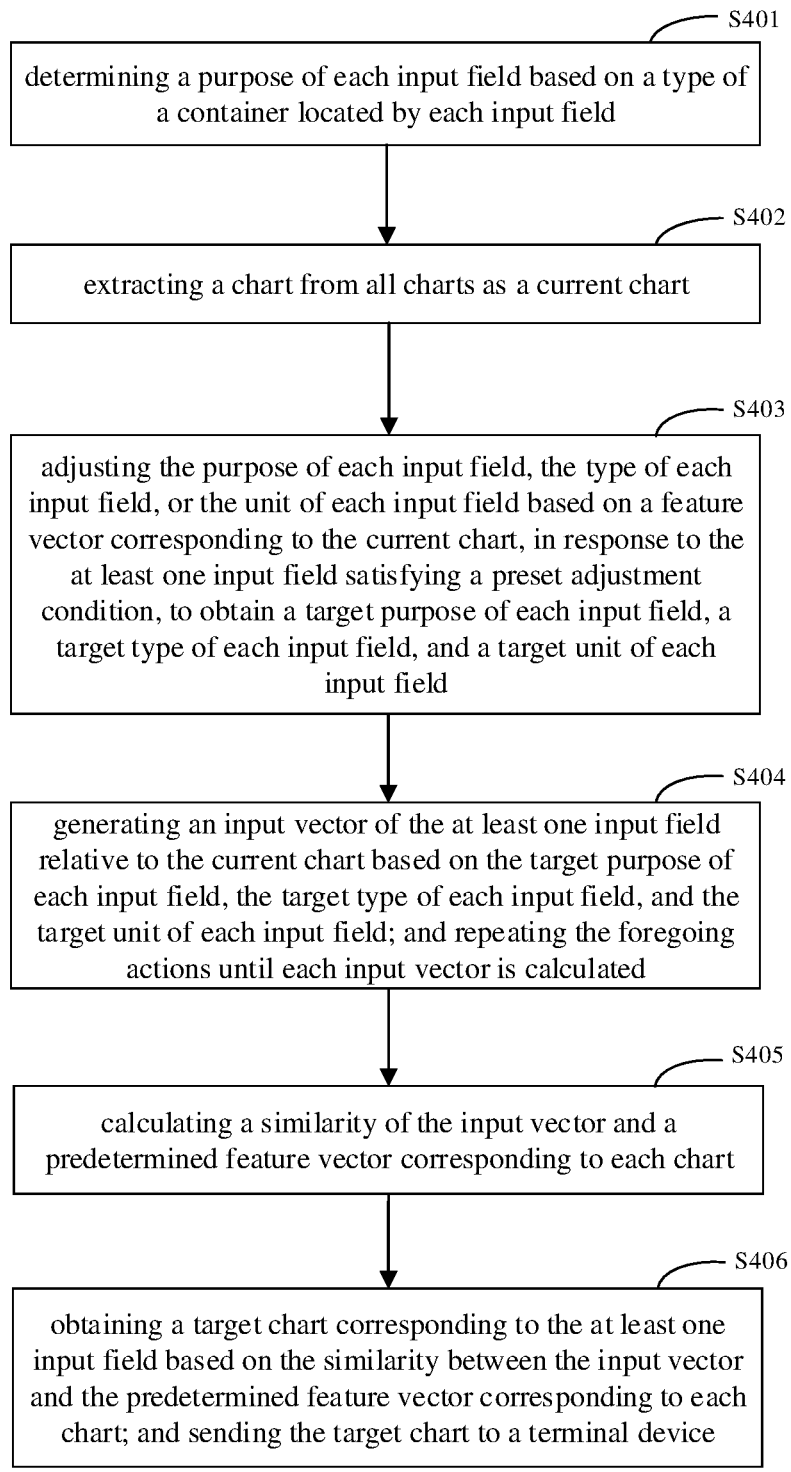
FIG. 4 is a third flowchart illustrating a method for recommending a chart according to some embodiments of the disclosure.

FIG. 4 is a third flowchart illustrating a method for recommending a chart according to some embodiments of the disclosure. Based on the above technical solution, further optimization and expansion may be performed, and may be combined with various alternative embodiments described above. As illustrated in FIG. 4, the method may include the following.

At block S401, a purpose of each input field is determined based on a type of a container located by each input field.

At block S402, a chart is extracted from all charts as a current chart.

At block S403, the purpose of each input field, the type of each input field, or the unit of each input field is adjusted based on a feature vector corresponding to the current chart, in response to the at least one input field satisfying a preset adjustment condition, to obtain a target purpose of each input field, a target type of each input field, and a target unit of each input field.

In this action, in response to the at least one input field satisfying the preset adjustment condition, the electronic device may adjust the purpose of each input field, the type of each input field, or the unit of each input field based on the feature vector corresponding to the current chart, to obtain the target purpose of each input field, the target type of each input field, and the target unit of each input field. In detail, the adjustment condition in some embodiments of the disclosure may refer to that the content expression of the at least one input field before adjusting may not be affected after adjusting each input field. For example, the field main type may include: dimension, measurement, and arbitrary; since the field main type includes "arbitrary", the main type of one field may be adjusted to "arbitrary" from "dimension"; or adjusted to "arbitrary" from "measurement"; for example, the field subtype may include: geography, longitude, latitude, date, time; since the field subtype does not include "arbitrary", it is not possible to adjust the subtype of one field to "arbitrary". That is, for a set of input fields, when compared with the feature vectors of different charts, the generated input vectors may be different. When the input vector is generated, the distance from the feature vector of the current chart may be as low as possible. For example, the input field N has a dimension, and two measurements. In the feature vector A, it requires a dimension, a measurement, and two arbitrary fields, corresponding to [1, 1, 2], the input vector at this time corresponds to [1, 1, 1]; in the feature vector B, it requires a dimension and two measurements, corresponding to [1, 2, 0], the input vector at this time corresponds to [1, 2, 0].

At block S404, an input vector of the at least one input field relative to the current chart is generated based on the target purpose of each input field, the target type of each input field, and the target unit of each input field; and the foregoing actions are repeated until each input vector is calculated.

In this action, the electronic device may generate the input vector of the at least one input field relative to the current chart based on the target purpose of each input field, the target type of each input field, and the target unit of each input field; and repeat the foregoing actions until each input vector is calculated. In detail, the electronic device may determine a value of each factor associated with a field purpose in the input vector based on the target purpose of each input field; determine a value of each factor associated with a field main type and a value of each factor associated with a field subtype in the input vector based on the target type of each input field; in which the type of the input field includes the field main type and the field subtype; determine a value of each factor associated with a chart feature in the input vector based on the target type of each input field and the target unit of each input field; and generate the input vector based on the value of each factor associated with the field purpose, the value of each factor associated with the field main type, the value of each factor associated with the field subtype, and the value of each factor associated with the chart feature.

At block S405, a similarity of the input vector and a predetermined feature vector corresponding to each chart is calculated.

In this action, the electronic device may perform the similarity calculation on the input vector and the predetermined feature vector corresponding to each chart to obtain the similarity of the input vector and each feature vector. In detail, the electronic device may extract a chart from all charts as a current chart; calculate a similarity of an input vector of the at least one input field relative to the current chart and a feature vector corresponding to the current chart based on the input vector of the at least one input field relative to the current chart and the feature vector corresponding to the current chart; and repeat the foregoing action of extracting the current chart until the similarity between each input vector and each feature vector is calculated. In detail, the electronic device may extract a factor from the input vector of the at least one input field relative to the current chart as a current input factor; extract a factor from the feature vector corresponding to the current chart as a current feature factor; mark a component corresponding to the current input factor and the current feature factor as a valid component in response to the current input factor being the same as the current feature factor; mark a component corresponding to the current input factor and the current feature factor as an invalid component in response to the current input factor being not the same as the current feature factor; repeat the foregoing actions of extracting the current input factor and the current feature factor as described above until a component corresponding to each input factor and each feature factor is marked as the valid component or the invalid component; and calculate the similarity of the input vector of the at least one input field relative to the current chart and the feature vector corresponding to the current chart based on the component corresponding to each input factor and each feature factor and a preset weight value of each component. For example, the weight value of the first component to the fifth component is 100, the weight value of the sixth component to the eighth component is 90, and the weight value of the ninth component to the tenth component is 50, and the weight value of the eleventh component to the fourteenth component is 10.

At block S406, a target chart corresponding to the at least one input field is obtained based on the similarity between the input vector and the predetermined feature vector corresponding to each chart; and the target chart is sent to a terminal device.

The implementation of the disclosure may significantly reduce the complexity of the recommending algorithm logic, making it becomes feasible to perform chart recommendation for the scene where there are many types of charts and complex fields; when adding the chart type, the feature vector of the chart is required only, and the recommending logic is not adjusted; when the measurement indicator is added, the vector format is required to expand, and the impact on the existing recommending logic is controllable; in addition, the disclosure calculates the similarity of the feature vector of each chart, so that the recommending result naturally forms a list of sequences sorted in recommendations, delivering more information to the user as a reference.

With the method for recommending the chart proposed in the disclosure, the input vector of the at least one input field relative to each chart is generated based on the at least one input field obtained in advance. The similarity of the input vector and the predetermined feature vector corresponding to each chart is calculated. The target chart corresponding to the at least one input field is obtained based on the similarity between the input vector and the predetermined feature vector corresponding to each chart; and the target chart is sent to a terminal device. That is, the disclosure may calculate the input vector of the at least one input field for each of the charts; calculate different input vectors for different charts on the same at least one input field; and calculate the similarity of each input vector and the feature vector corresponding to each chart. In the existing method for recommending the chart, the recommending may be performed based on pre-defined decision tree, which is unable to apply to a scene where there are many types of charts and complex fields. Since the disclosure employs the technical means of calculating the input vector of the at least one input field for each of the charts respectively, and calculating the similarity based on each input vector and each feature vector, the technical problems that the existing method for recommending the chart based on the pre-defined decision tree may be unable to apply to the scene where there are many types of charts and complex fields may be overcome. The technical solutions provided by the disclosure may not only effectively reduce the complexity of chart recommendation, but also improve the accuracy of chart recommendation; in addition, the technical solutions provided by the disclosure may be simple and convenient, easy to popularize, and have a wide range of applications.

Figure 5:
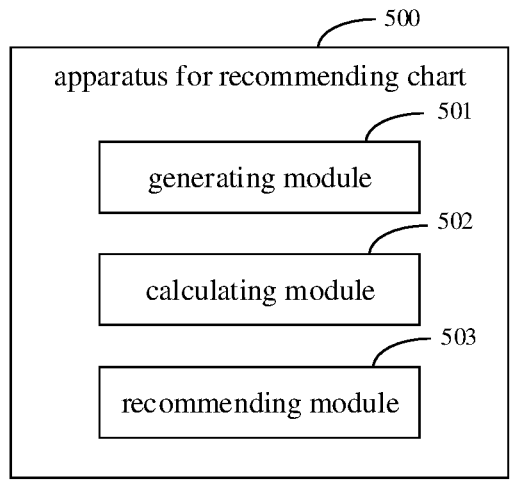
FIG. 5 is a block diagram illustrating an apparatus for recommending a chart according to some embodiments of the disclosure.

FIG. 5 is a block diagram illustrating an apparatus for recommending a chart according to some embodiments of the disclosure. As illustrated in FIG. 5, the apparatus 500 may include a generating module 501, a calculating module 502, and a recommending module 503.

The generating module 501 is configured to generate an input vector of at least one input field relative to each chart based on the at least one input field obtained in advance.

The calculating module 502 is configured to calculate a similarity of the input vector and a predetermined feature vector corresponding to each chart.

The recommending module 503 is configured to obtain a target chart corresponding to the at least one input field based on the similarity between the input vector and the predetermined feature vector corresponding to each chart, and send the target chart to a terminal device.

Figure 6:
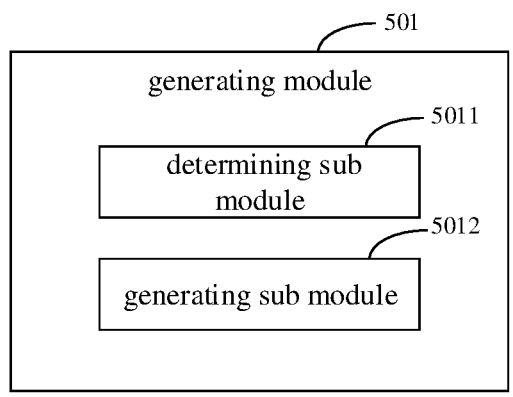
FIG. 6 is a block diagram illustrating a generating module according to some embodiments of the disclosure.

FIG. 6 is a block diagram illustrating a generating module according to some embodiments of the disclosure. As illustrated in FIG. 6, the generating module 501 may include a determining sub module 5011 and a generating sub module 5012.

The determining sub module 5011 is configured to determine a purpose of each input field based on a type of a container located by each input field.

The generating sub module 5012 is configured to generate the input vector based on the purpose of each input field, a predetermined type of each input field, and a unit of each input field.

Furthermore, the generating sub module 5011 is configured to: extract a chart from all charts as a current chart; adjust the purpose of each input field, the type of each input field, or the unit of each input field based on a feature vector corresponding to the current chart, in response to the at least one input field satisfying a preset adjustment condition, to obtain a target purpose of each input field, a target type of each input field, and a target unit of each input field; generate an input vector of the at least one input field relative to the current chart based on the target purpose of each input field, the target type of each input field, and the target unit of each input field; and repeat the foregoing actions until each input vector is calculated.

Furthermore, the generating sub module 5012 is configured to: determine a value of each factor associated with a field purpose in the input vector based on the target purpose of each input field; determine a value of each factor associated with a field main type and a value of each factor associated with a field subtype in the input vector based on the target type of each input field; in which the type of the input field includes the field main type and the field subtype; determine a value of each factor associated with a chart feature in the input vector based on the target type of each input field and the target unit of each input field; and generate the input vector based on the value of each factor associated with the field purpose, the value of each factor associated with the field main type, the value of each factor associated with the field subtype, and the value of each factor associated with the chart feature.

Furthermore, each factor associated with the field purpose includes: a number of color fields, a number of angle fields, a number of row fields, and a number of column fields; each factor associated with the field main type includes: a number of dimension fields, a number of measurement fields, and a number of arbitrary fields; each factor associated with the field subtype includes: a number of geographic fields, a number of longitude fields, a number of latitude fields, a number of date fields, and a number of time fields; and each factor associated with the chart feature includes: whether there is at least one field whose subtype is a date in the at least one input field, and whether there are at least two fields with different units in the at least one input field.

Furthermore, the calculating module 502 is configured to: extract a chart from all charts as a current chart; calculate a similarity of an input vector of the at least one input field relative to the current chart and a feature vector corresponding to the current chart based on the input vector of the at least one input field relative to the current chart and the feature vector corresponding to the current chart; and repeat the foregoing action of extracting the current chart until the similarity between each input vector and each feature vector is calculated.

Furthermore, the calculating module 502 is configured to: extract a factor from the input vector of the at least one input field relative to the current chart as a current input factor; extract a factor from the feature vector corresponding to the current chart as a current feature factor; mark a component corresponding to the current input factor and the current feature factor as a valid component in response to the current input factor being the same as the current feature factor; mark a component corresponding to the current input factor and the current feature factor as an invalid component in response to the current input factor being not the same as the current feature factor; repeat the foregoing actions of extracting the current input factor and the current feature factor as described above until a component corresponding to each input factor and each feature factor is marked as the valid component or the invalid component; and calculate the similarity of the input vector of the at least one input field relative to the current chart and the feature vector corresponding to the current chart based on the component corresponding to each input factor and each feature factor and a preset weight value of each component.

The above-described apparatus May 31, 2021 perform the method of any embodiment of the disclosure, with functional modules and beneficial effects of performing the method. Details of the technical details are not described in detail in the embodiments, reference should be made to the method provided in any embodiment of the disclosure.

An electronic device and a readable storage medium are further provided according to some embodiments of the disclosure.

Figure 7:
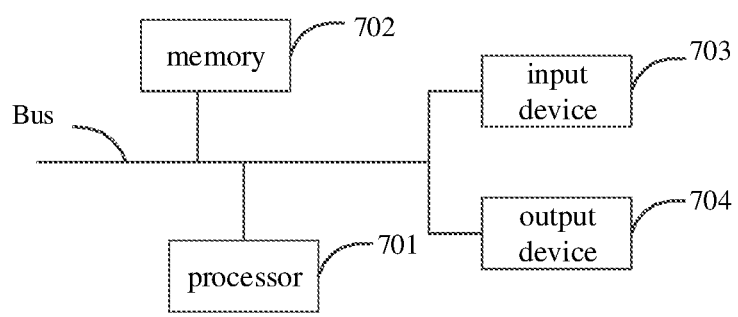
FIG. 7 is a block diagram illustrating an electronic device for implementing a method for recommending a chart according to some embodiments of the disclosure.

As illustrated in FIG. 7, FIG. 7 is a block diagram illustrating an electronic device for implementing a method for recommending a chart according to some embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 7, the electronic device includes: one or more processors 701, a memory 702, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 7, a processor 701 is taken as an example.

The memory 702 is a non-transitory computer readable storage medium provided by the disclosure. The memory is configured to store instructions executable by at least one processor, to enable the at least one processor to execute the method provided by the disclosure. The non-transitory computer readable storage medium provided by the disclosure is configured to store computer instructions. The computer instructions are configured to enable a computer to execute the method provided by the disclosure.

As the non-transitory computer readable storage medium, the memory 702 may be configured to store non-transitory software programs, non-transitory computer executable programs and modules, such as program instructions/module corresponding to the method according to embodiments of the disclosure (such a generating module 501, a calculating module 502, and a recommending module 503 in FIG. 5). The processor 701 is configured to execute various functional applications and data processing of the server by operating non-transitory software programs, instructions and modules stored in the memory 702, that is, implements the method according to the above method embodiments.

The memory 702 may include a storage program region and a storage data region. The storage program region may store an application required by an operating system and at least one function. The storage data region may store data created according to predicted usage of the electronic device based on the semantic representation. In addition, the memory 702 may include a high-speed random access memory, and may also include a non-transitory memory, such as at least one disk memory device, a flash memory device, or other non-transitory solid-state memory device. In some embodiments, the memory 702 may optionally include memories remotely located to the processor 701, and these remote memories may be connected to the electronic device via a network. Examples of the above network include, but are not limited to, an Internet, an intranet, a local area network, a mobile communication network and combinations thereof.

The electronic device capable of implementing the method may also include: an input device 703 and an output device 704. The processor 701, the memory 702, the input device 703, and the output device 704 may be connected via a bus or in other means. In FIG. 7, the bus is taken as an example.

The input device 703 may receive inputted digital or character information, and generate key signal input related to user setting and function control of the electronic device capable of implementing the method, such as a touch screen, a keypad, a mouse, a track pad, a touch pad, an indicator stick, one or more mouse buttons, a trackball, a joystick and other input device. The output device 704 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solutions according to embodiments of the disclosure, the input vector of the at least one input field relative to each chart is generated based on the at least one input field obtained in advance. The similarity of the input vector and the predetermined feature vector corresponding to each chart is calculated. The target chart corresponding to the at least one input field is obtained based on the similarity between the input vector and the predetermined feature vector corresponding to each chart; and the target chart is sent to a terminal device. That is, the disclosure may calculate the input vector of the at least one input field for each of the charts; calculate different input vectors for different charts on the same at least one input field; and calculate the similarity of each input vector and the feature vector corresponding to each chart. In the existing method for recommending the chart, the recommending may be performed based on pre-defined decision tree, which is unable to apply to a scene where there are many types of charts and complex fields. Since the disclosure employs the technical means of calculating the input vector of the at least one input field for each of the charts respectively, and calculating the similarity based on each input vector and each feature vector, the technical problems that the existing method for recommending the chart based on the pre-defined decision tree may be unable to apply to the scene where there are many types of charts and complex fields may be overcome. The technical solutions provided by the disclosure may not only effectively reduce the complexity of chart recommendation, but also improve the accuracy of chart recommendation; in addition, the technical solutions provided by the disclosure may be simple and convenient, easy to popularize, and have a wide range of applications.

It should be understood that, steps may be reordered, added or deleted by utilizing flows in the various forms illustrated above. For example, the steps described in the disclosure may be executed in parallel, sequentially or in different sequences, so long as desired results of the technical solutions disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for recommending a chart, comprising:
   generating an input vector of at least one input field relative to each chart based on the at least one input field obtained in advance, comprising: determining a purpose of each input field based on a type of a container located by each input field; and wherein generating the input vector is based on the purpose of each input field, a predetermined type of each input field, and a unit of each input field;
   calculating a similarity of the input vector and a predetermined feature vector corresponding to each chart;
   obtaining a target chart corresponding to the at least one input field based on the similarity between the input vector and the predetermined feature vector corresponding to each chart; and
   sending the target chart to a terminal device,
   wherein generating the input vector comprises:
      extracting a chart from all charts as a current chart;
      adjusting the purpose of each input field, the type of each input field, or the unit of each input field based on a feature vector corresponding to the current chart, in response to the at least one input field satisfying a preset adjustment condition, to obtain a target purpose of each input field, a target type of each input field, and a target unit of each input field:
      generating an input vector of the at least one input field relative to the current chart based on the target purpose of each input field, the target type of each input field, and the target unit of each input field; and
      repeating the foregoing actions until each input vector is calculated.

2. The method as claimed in claim 1, wherein generating the input vector of the at least one input field relative to the current chart based on the target purpose of each input field, the target type of each input field, and the target unit of each input field comprises:
   determining a value of each factor associated with a field purpose in the input vector based on the target purpose of each input field;
   determining a value of each factor associated with a field main type and a value of each factor associated with a field subtype in the input vector based on the target type of each input field; in which the type of the input field includes the field main type and the field subtype;
   determining a value of each factor associated with a chart feature in the input vector based on the target type of each input field and the target unit of each input field; and
   generating the input vector based on the value of each factor associated with the field purpose, the value of each factor associated with the field main type, the value of each factor associated with the field subtype, and the value of each factor associated with the chart feature.

3. The method as claimed in claim 2, wherein
each factor associated with the field purpose comprises: a number of color fields, a number of angle fields, a number of row fields, and a number of column fields;
each factor associated with the field main type comprises: a number of dimension fields, a number of measurement fields, and a number of arbitrary fields;
each factor associated with the field subtype comprises: a number of geographic fields, a number of longitude fields, a number of latitude fields, a number of date fields, and a number of time fields; and
each factor associated with the chart feature comprises: whether there is at least one field whose subtype is a date in the at least one input field, and whether there are at least two fields with different units in the at least one input field.

4. The method as claimed in claim 1, wherein calculating the similarity of the input vector and the predetermined feature vector corresponding to each chart comprises:
extracting a chart from all charts as a current chart;
calculating a similarity of an input vector of the at least one input field relative to the current chart and a feature vector corresponding to the current chart based on the input vector of the at least one input field relative to the current chart and the feature vector corresponding to the current chart; and
repeating the foregoing action of extracting the current chart until the similarity between each input vector and each feature vector is calculated.

5. The method as claimed in claim 4, wherein calculating the similarity of the input vector of the at least one input field relative to the current chart and the feature vector corresponding to the current chart based on the input vector of the at least one input field relative to the current chart and the feature vector corresponding to the current chart comprises:
extracting a factor from the input vector of the at least one input field relative to the current chart as a current input factor;
extracting a factor from the feature vector corresponding to the current chart as a current feature factor;
marking a component corresponding to the current input factor and the current feature factor as a valid component in response to the current input factor being the same as the current feature factor;
marking a component corresponding to the current input factor and the current feature factor as an invalid component in response to the current input factor being not the same as the current feature factor;
repeating the foregoing actions of extracting the current input factor and the current feature factor as described above until a component corresponding to each input factor and each feature factor is marked as the valid component or the invalid component; and
calculating the similarity of the input vector of the at least one input field relative to the current chart and the feature vector corresponding to the current chart based on the component corresponding to each input factor and each feature factor and a preset weight value of each component.

6. An electronic device, comprising:
at least one processor; and
a memory communicatively coupled to the at least one processor; wherein,
the memory is configured to store instructions executable by the at least one processor, and when the instructions are executed by the at least one processor, the at least one processor is caused to perform:
generating an input vector of at least one input field relative to each chart based on the at least one input field obtained in advance, comprising: determining a purpose of each input field based on a type of a container located by each input field; and wherein generating the input vector is based on the purpose of each input field, a predetermined type of each input field, and a unit of each input field;
calculating a similarity of the input vector and a predetermined feature vector corresponding to each chart;
obtaining a target chart corresponding to the at least one input field based on the similarity between the input vector and the predetermined feature vector corresponding to each chart; and
sending the target chart to a terminal device,
wherein generating the input vector comprises:
extracting a chart from all charts as a current chart;
adjusting the purpose of each input field, the type of each input field, or the unit of each input field based on a feature vector corresponding to the current chart, in response to the at least one input field satisfying a preset adjustment condition, to obtain a target purpose of each input field, a target type of each input field, and a target unit of each input field:
generating an input vector of the at least one input field relative to the current chart based on the target purpose of each input field, the target type of each input field, and the target unit of each input field; and
repeating the foregoing actions until each input vector is calculated.

7. The device as claimed in claim 6, wherein generating the input vector of the at least one input field relative to the current chart based on the target purpose of each input field, the target type of each input field, and the target unit of each input field comprises:
determining a value of each factor associated with a field purpose in the input vector based on the target purpose of each input field;
determining a value of each factor associated with a field main type and a value of each factor associated with a field subtype in the input vector based on the target type of each input field; in which the type of the input field includes the field main type and the field subtype;
determining a value of each factor associated with a chart feature in the input vector based on the target type of each input field and the target unit of each input field; and
generating the input vector based on the value of each factor associated with the field purpose, the value of each factor associated with the field main type, the value of each factor associated with the field subtype, and the value of each factor associated with the chart feature.

8. The device as claimed in claim 7, wherein
each factor associated with the field purpose comprises: a number of color fields, a number of angle fields, a number of row fields, and a number of column fields;
each factor associated with the field main type comprises: a number of dimension fields, a number of measurement fields, and a number of arbitrary fields;
each factor associated with the field subtype comprises: a number of geographic fields, a number of longitude fields, a number of latitude fields, a number of date fields, and a number of time fields; and each factor associated with the chart feature comprises: whether there is at least one field whose subtype is a date in the at least one input field, and whether there are at least two fields with different units in the at least one input field.

9. The device as claimed in claim 6, wherein calculating the similarity of the input vector and the predetermined feature vector corresponding to each chart comprises:

extracting a chart from all charts as a current chart;

calculating a similarity of an input vector of the at least one input field relative to the current chart and a feature vector corresponding to the current chart based on the input vector of the at least one input field relative to the current chart and the feature vector corresponding to the current chart; and repeating the foregoing action of extracting the current chart until the similarity between each input vector and each feature vector is calculated.

10. The device as claimed in claim 9, wherein calculating the similarity of the input vector of the at least one input field relative to the current chart and the feature vector corresponding to the current chart based on the input vector of the at least one input field relative to the current chart and the feature vector corresponding to the current chart comprises:

extracting a factor from the input vector of the at least one input field relative to the current chart as a current input factor;

extracting a factor from the feature vector corresponding to the current chart as a current feature factor;

marking a component corresponding to the current input factor and the current feature factor as a valid component in response to the current input factor being the same as the current feature factor;

marking a component corresponding to the current input factor and the current feature factor as an invalid component in response to the current input factor being not the same as the current feature factor;

repeating the foregoing actions of extracting the current input factor and the current feature factor as described above until a component corresponding to each input factor and each feature factor is marked as the valid component or the invalid component; and calculating the similarity of the input vector of the at least one input field relative to the current chart and the feature vector corresponding to the current chart based on the component corresponding to each input factor and each feature factor and a preset weight value of each component.

11. A non-transitory computer-readable storage medium storing computer instructions, wherein the computer instructions are configured to enable a computer to perform a method for recommending a chart, the method comprising:

generating an input vector of at least one input field relative to each chart based on the at least one input field obtained in advance, comprising: determining a purpose of each input field based on a type of a container located by each input field; and wherein generating the input vector is based on the purpose of each input field, a predetermined type of each input field, and a unit of each input field;

calculating a similarity of the input vector and a predetermined feature vector corresponding to each chart;

obtaining a target chart corresponding to the at least one input field based on the similarity between the input vector and the predetermined feature vector corresponding to each chart; and sending the target chart to a terminal device, wherein generating the input vector comprises:

extracting a chart from all charts as a current chart;

adjusting the purpose of each input field, the type of each input field, or the unit of each input field based on a feature vector corresponding to the current chart, in response to the at least one input field satisfying a preset adjustment condition, to obtain a target purpose of each input field, a target type of each input field, and a target unit of each input field:

generating an input vector of the at least one input field relative to the current chart based on the target purpose of each input field, the target type of each input field, and the target unit of each input field; and repeating the foregoing actions until each input vector is calculated.

12. The non-transitory computer-readable storage medium as claimed in claim 11, wherein generating the input vector of the at least one input field relative to the current chart based on the target purpose of each input field, the target type of each input field, and the target unit of each input field comprises:

determining a value of each factor associated with a field purpose in the input vector based on the target purpose of each input field;

determining a value of each factor associated with a field main type and a value of each factor associated with a field subtype in the input vector based on the target type of each input field; in which the type of the input field includes the field main type and the field subtype;

determining a value of each factor associated with a chart feature in the input vector based on the target type of each input field and the target unit of each input field; and generating the input vector based on the value of each factor associated with the field purpose, the value of each factor associated with the field main type, the value of each factor associated with the field subtype, and the value of each factor associated with the chart feature.

13. The non-transitory computer-readable storage medium as claimed in claim 11, wherein calculating the similarity of the input vector and the predetermined feature vector corresponding to each chart comprises:

extracting a chart from all charts as a current chart;

calculating a similarity of an input vector of the at least one input field relative to the current chart and a feature vector corresponding to the current chart based on the input vector of the at least one input field relative to the current chart and the feature vector corresponding to the current chart; and repeating the foregoing action of extracting the current chart until the similarity between each input vector and each feature vector is calculated.

14. The non-transitory computer-readable storage medium as claimed in claim 13, wherein calculating the similarity of the input vector of the at least one input field relative to the current chart and the feature vector corresponding to the current chart based on the input vector of the at least one input field relative to the current chart and the feature vector corresponding to the current chart comprises:

extracting a factor from the input vector of the at least one input field relative to the current chart as a current input factor;

extracting a factor from the feature vector corresponding to the current chart as a current feature factor;

marking a component corresponding to the current input factor and the current feature factor as a valid component in response to the current input factor being the same as the current feature factor;

marking a component corresponding to the current input factor and the current feature factor as an invalid component in response to the current input factor being not the same as the current feature factor;

repeating the foregoing actions of extracting the current input factor and the current feature factor as described above until a component corresponding to each input factor and each feature factor is marked as the valid component or the invalid component; and calculating the similarity of the input vector of the at least one input field relative to the current chart and the feature vector corresponding to the current chart based on the component corresponding to each input factor and each feature factor and a preset weight value of each component.

* * * * *